Sept. 3, 1929.  C. L. RAYFIELD  1,727,082
FLOAT CONTROLLED VALVE
Filed Dec. 29, 1927
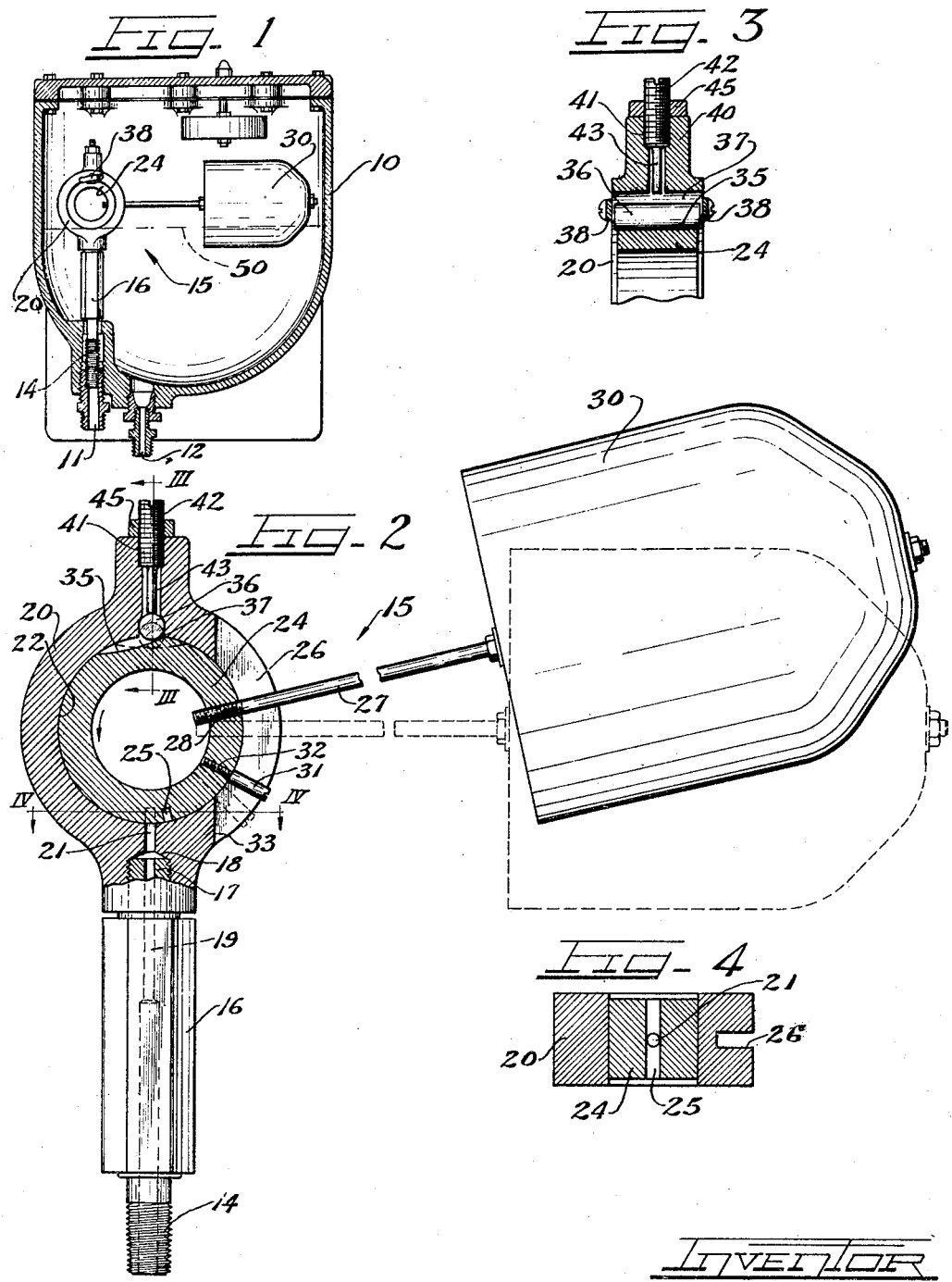
Inventor
Charles L. Rayfield
By Charles Still
Attys.

Patented Sept. 3, 1929.

1,727,082

UNITED STATES PATENT OFFICE.

CHARLES L. RAYFIELD, OF CHICAGO, ILLINOIS, ASSIGNOR TO RAYFIELD MANUFACTURING CO., OF CHICAGO, ILLINOIS, A CORPORATION OF ILLINOIS.

FLOAT-CONTROLLED VALVE.

Application filed December 29, 1927. Serial No. 243,359.

The present invention relates in general to valves, and more particularly to liquid level control valves.

An object of the present invention is to provide an improved float controlled valve especially adapted for use in connection with oil burner systems.

Another object of the present invention is to provide a float controlled valve adapted to be automatically closed through the means of a wedging action when the fluid associated with the valve has risen to a predetermined level.

In accordance with the general features of the present invention I provide a valve including a body having a circular recess, a cylindrical valve member disposed in the recess and movable to close an inlet in the valve body, a float for actuating the movable member, and wedging means adapted to force the movable member into firm engagement with the wall of the valve body defining the recess when the member is in the closed position so as to prevent any leakage of fluid from the inlet of the body past the movable valve member.

Other objects and advantages of the present invention will more fully appear from the following detailed description taken in connection with the accompanying drawing, which illustrates a single embodiment thereof and in which:

Figure 1 is a fragmentary sectional view, partly in elevation, through a fluid container in which is mounted a float control valve embodying the features of the present invention;

Figure 2 is an enlarged view, partly in section, of my novel float control valve;

Figure 3 is a fragmentary vertical sectional view taken on substantially the line III—III of Figure 2 looking in the direction indicated by the arrows and showing the position of the wedging pin when the valve is in its open position, and Figure 4 is a horizontal sectional view taken on substantially the line IV—IV of Figure 2 looking downwardly and showing the rotary valve member in its open position.

In the drawings:

Like reference characters designate similar parts throughout the several views.

The reference character 10 designates generally a fluid container including an inlet 11 and an outlet 12. Threaded into the inlet 11 is the tubular stem 14 of my novel valve mechanism designated generally by the reference character 15. The stem 14 is formed integral with a tubular hexagonal member 16 having a threaded reduced portion 17 at its upper end threaded into an opening 18 in the valve body 20. The bore 19 of member 16 communicates with an inlet 21 formed in the valve body. This inlet 21 terminates at its inner end in the circular recess 22 formed in the valve body 20. Disposed in the circular recess 22 is a rotary valve or ring member 24 which has formed in a portion of its periphery at the lower end a transverse slot 25 opening to the exterior of the body and adapted to be aligned with the inlet opening 21 in valve body 20.

This wedging action is sufficiently great to prevent any jars imposed on the tank 10 or stem 14 from jarring or moving the valve member 24 relative to the body when the valve is in a closed position and in that way minimizes the chances of any liquid seeping into the tank 10.

The valve body 20 has formed in one of its sides a vertical recess 26 through which extends a rod 27 having its inner end threaded at 28 into the rotary valve member 24 and having its outer end secured to a cylindrical float 30. Also extending into the slot 26 is a stop pin 31 having its inner end reduced at 32 and threaded into the rotary valve member 24. This stop pin is adapted, when the rotary valve member is in its open position, to strike the shoulder 33 defining the lower end of slot 26.

The upper end of the rotary valve member 24 is cut away, as indicated at 35, in order to form an arcuate depression in the periphery of the rotary valve member 24. This depression 35, as shown in Figure 3, extends across the top of the valve member 24. Positioned on the curved surface defining the arcuate depression 35 is a cylindrical transverse wedging pin 36. The valve body 20 has formed in it a transverse slot 37 disposed above the depression 35 in valve member 24 and adapted to receive and accommodate pin 36. This pin is held within the body 20 by means of arms 38—38 pivotally attached to the sides of the valve body 20 and adapted to extend over the ends of the slot 37 to prevent the pin 36 from being displaced therefrom.

Formed integral with the upper end of the valve body 20 is a boss 40 having a substantially central opening 41 (Figure 3). Threaded into the opening 41 is an adjustable pin 42 including a reduced shank 43, the lower end of which is adapted to project into the slot 37. Threaded onto the upper end of this adjustable pin 42 is a lock nut 45 adapted to engage the top of the boss 40. It will be evident that by varying the position of the pin 42, it is possible to limit the upward travel of pin 36 in slot 37.

The operation of my novel float control valve is briefly as follows:

I have illustrated by dotted lines in Figure 2 the position of the parts of the valve when the same is in its open position. When the valve is open the slot 25 will be disposed in register with the inlet 21 in valve body 20, and the float 30 will be positioned in the lowermost position shown by dotted lines in Figure 2. Also the wedging pin 36 will be disposed out of engagement with the lower end of the shank 43 on pin 42 and will be resting on the arcuate surface defining the depression 35 in the upper end of the rotary valve member 24.

Now it will be evident that as the liquid level rises in the tank or container 10, the float 30 will gradually be elevated. When the liquid in the container has reached a predetermined level, such as that indicated by the dotted line 50 in Figure 1, the float 30 will have traveled to its uppermost position, such as that shown in full lines in Figure 2. The upward movement of the float 30 results in the rotation of the valve member 24 in the direction indicated by the arrow in Figure 2. As this member 24 is turned in a counter-clockwise direction, the arcuate surface on its upper end defining depression 35 gradually raises pin 36 up into the transverse slot 37 in the body 20. This upward movement of the pin 36 will continue until it strikes the shank 43 of the adjustable stud or pin 42. When this occurs, the slot 25 will no longer be in register with the inlet passageway 21 in the valve body.

The upward pressure exerted on the float 30 thereafter will be translated into a wedging pressure between the upper end of rotary member 24 and pin 36. This wedging pressure will force the lower end of the rotary valve member into tight engagement with the lower portion of the wall defining circular recess 21. In other words, the force of this wedging action will be applied to portions of the ring member 24 diametrically opposite the pin 36. Obviously since the inlet 21 in the valve body 20 is located diametrically opposite the pin 36, it necessarily follows that the rotary valve member 24 will be wedged into tight engagement with the portion of the valve body 20 adjacent the discharge orifice of the inlet passageway 21. The result of this wedging action will be to cause the valve member to so tightly engage the valve body at the inlet passageway 21 as to prevent any liquid from seeping into the container 10 past the lower edge of the rotary valve member 24.

It will also be evident that as the liquid is withdrawn from the container 10 through the outlet 12 (Figure 1) the float 30 will move downwardly until the stop pin 31 carried by the rotary valve member 24 strikes the shoulder 33. This pin 31 serves to limit the downward movement of the valve 20 as well as the clockwise movement of the rotary valve member 24. When the stop pin 31 strikes the shoulder 33, the slot 25 in rotary valve member 24 will again be in register with the inlet passageway 21 at which time liquid will be allowed to flow into the container.

Attention is also directed to the fact that by adjusting the position of pin 42, it is possible to vary the wedging action exerted upon the rotary valve member 24 as well as to vary the time in which this action will take place. For example, if the shank 43 of the pin 42 is moved downwardly further into transverse slot 37, this will mean that less movement on the part of the float 30 will be necessary in order to bring about the wedging action. Moreover, since the float 30 will then be in a position to close the valve sooner than before, it necessarily follows that the valve will be closed when a slightly less liquid level is attained in the container 10. Conversely, by slightly raising the shank 43 of pin 42 it is possible to slightly increase the level of the liquid which will be maintained in the container 10 by the valve 15.

Now, of course, it is to be understood that although I have illustrated and described in detail the preferred form of my invention, the invention is not to be thus limited, but only in so far as defined by the scope and spirit of the appended claims.

I claim as my invention:

1. In a valve, a valve body having a recess and an inlet passageway formed therein having its innermost end terminating at the recess, a rotary valve member positioned in the recess having a slot opening to the exterior of said body and adapted to be registered with said inlet passageway when the valve is in its open position, means for rotating said rotary member to bring said slot out of register with said passageway, and means adapted when said slot is out of register with the passageway to wedge the rotary member into tight engagement with the valve body at the discharge orifice of the passageway to prevent seepage of fluid past the valve member.

2. In a valve, a valve body having a recess and an inlet passageway formed therein having its innermost end terminating at the recess, a rotary valve member position in the recess having a slot opening to the exterior of said body and adapted to be registered with said inlet passageway when the valve is in its open position, means for rotating said rotary member to bring said slot out of register with said passageway, and means adapted when said slot is out of register with the passageway to wedge the rotary member into tight engagement with the valve body at the discharge orifice of the passageway to prevent seepage of fluid past the valve member, said latter means including a wedging pin adapted to engage a peripheral portion of said valve member.

3. In a valve, a valve body having a recess and an inlet passageway formed therein having its innermost end terminating at the recess, a rotary valve member positioned in the recess having a slot opening to the exterior of said body and adapted to be registered with said inlet passageway when the valve is in its open position, means for rotating said rotary member to bring said slot out of register with said passageway, and means adapted when said slot is out of register with the passageway to wedge the rotary member into tight engagement with the valve body at the discharge orifice of the passageway to prevent seepage of fluid past the valve member, said latter means including a transverse wedging pin adapted to engage an arcuate depression formed in said valve member to force said member into engagement with the wall of the body defining said recess.

4. In a valve, a valve body having a recess and an inlet passageway formed therein having its innermost end terminating at the recess, a rotary valve member positioned in the recess having a slot opening to the exterior of said body and adapted to be registered with said inlet passageway when the valve is in its open position, means for rotating said rotary member to bring said slot out of register with said passageway, and means adapted when said slot is out of register with the passageway to wedge the rotary member into tight engagement with the valve body at the discharge orifice of the passageway to prevent seepage of fluid past the valve member, said latter means being diametrically opposite said inlet passageway.

5. In a valve, a valve body having a recess and an inlet passageway formed therein having its innermost end terminating at the recess, a rotary valve member positioned in the recess having a slot opening to the exterior of said body and adapted to be registered with said inlet passageway when the valve is in its open position, means for rotating said rotary member to bring said slot out of register with said passageway, and means adapted when said slot is out of register with the passageway to wedge the rotary member into tight engagement with the valve body at the discharge orifice of the passageway to prevent seepage of fluid past the valve member, said means for moving the valve member comprising a float connected to the valve member by a rod extending through a slot formed in said valve body.

6. In a valve, a valve body having a recess and an inlet passageway formed therein having its innermost end terminating at the recess, a rotary valve member positioned in the recess having a slot opening to the exterior of said body and adapted to be registered with said inlet passageway when the valve is in its open position, means for rotating said rotary member to bring said slot out of register with said passageway, and means adapted when said slot is out of register with the passageway to wedge the rotary member into tight engagement with the valve body at the discharge orifice of the passageway to prevent seepage of fluid past the valve member, said wedging means serving to limit the travel of the valve member in the direction of movement for opening the valve.

7. In a valve, a valve body having a recess and an inlet passageway formed therein having its innermost end terminating at the recess, a rotary valve member positioned in the recess having a slot opening to the exterior of said body and adapted to be registered with said inlet passageway when the valve is in its open position, float means for rotating said rotary member to bring said slot out of register with said passageway, and means adapted when said slot is out of register with the passageway to wedge the rotary member into tight engagement with the valve body at the discharge orifice of the passageway to prevent seepage of fluid past the valve member, said wedging means being adjustable to vary the application of the wedging force to the valve member.

8. In a valve, a valve body having a recess and an inlet passageway formed therein having its innermost end terminating at the recess, a rotary valve member positioned in the recess having a slot opening to the exterior of said body and adapted to be registered with said inlet passageway when the valve is in its open position, means for rotating said rotary member to bring said slot out of register with said passageway, and means adapted when said slot is out of register with the passageway to wedge the rotary member into tight engagement with the valve body at the discharge orifice of the passageway to prevent seepage of fluid past the valve member, said latter means including a transverse wedging pin disposed in said body in contact with said valve member and an adjustable pin adapted to engage the transverse pin to cause a wedging action to be imparted to the valve member by a slight continuation in movement of the valve member.

9. In a valve, a pair of substantially concentric members, one of said members being movable relative to the other member, means for moving said movable member relative to the other member, a fluid passageway in said other member, said movable member including a fluid passageway adapted to be aligned with the passageway in said other member, and means operable by the movement of said movable member to a position wherein its passageway is out of register with the passageway in said other member for wed said members together, whereby a mechanical seal is formed between the members at the passageway in said other member, said wedging means including a transverse pin disposed in cooperation with a recessed portion in the periphery of said movable member.

10. In a valve, a pair of substantially concentric members, one of said members being movable relative to the other member, means for moving said movable member relative to the other member, a fluid passageway in said other member, said movable member including a fluid passageway adapted to be aligned with the passageway in said other member, and means operable by the movement of said movable member to a position wherein its passageway is out of register with the passageway in said other member for wedging said members together, whereby a mechanical seal is formed between the members at the passageway in said other member, said wedging means being diametrically opposite said passageway in said other member.

11. In a valve, a pair of substantially concentric members, one of said members being movable relative to the other member, means for moving said movable member relative to the other member, a fluid passageway in said other member, said movable member including a fluid passageway adapted to be aligned with the passageway in said other member, and means operable by the movement of said movable member to a position wherein its passageway is out of register with the passageway in said other member for wedging said members together, whereby a mechanical seal is formed between the members at the passageway in said other member, said wedging means being adjustable so as to control the degree of movement imparted to said movable member.

12. In a valve, a pair of substantially concentric members, one of said members being movable relative to the other member, means for moving said movable member relative to the other member, a fluid passageway in said other member, said movable member including a fluid passageway adapted to be aligned with the passageway in said other member, and means operable by the movement of said movable member to a position wherein its passageway is out of register with the passageway in said other member for wedging said members together, whereby a mechanical seal is formed between the members at the passageway in said other member, said means for actuating said movable member including a float connected thereto and said wedging means including a wedging pin adapted to at all times engage a depressed portion in the periphery of said movable member.

In testimony whereof I have hereunto subscribed my name at Chicago, Cook County, Illinois.

CHARLES L. RAYFIELD.